(12) United States Patent
Neufert

(10) Patent No.: US 6,596,661 B2
(45) Date of Patent: Jul. 22, 2003

(54) PROCESS FOR REGENERATING A DEACTIVATED CATALYST

(75) Inventor: Ronald Neufert, Michelau (DE)

(73) Assignee: Siemens Aktiengesellschaft, Munich (DE)

(*) Notice: Subject to any disclaimer, the term of this patent is extended or adjusted under 35 U.S.C. 154(b) by 36 days.

(21) Appl. No.: 09/761,811

(22) Filed: Jan. 16, 2001

(65) Prior Publication Data

US 2001/0003116 A1 Jun. 7, 2001

Related U.S. Application Data

(63) Continuation of application No. PCT/DE99/02067, filed on Jul. 5, 1999.

(30) Foreign Application Priority Data

Jul. 16, 1998 (DE) .......................... 198 32 057

(51) Int. Cl.[7] .................... B01J 38/58; B01J 20/34; B01J 38/62; B01J 38/50
(52) U.S. Cl. .............. 502/28; 502/29; 502/30
(58) Field of Search .............. 502/22, 27, 28, 502/29, 30, 34

(56) References Cited

U.S. PATENT DOCUMENTS 5,217,935 A * 6/1993 Van Driesen ............ 502/23

FOREIGN PATENT DOCUMENTS

| DE | 1 171 206 | 5/1964 |
|---|---|---|
| DE | 34 30 887 A1 | 2/1986 |
| DE | 40 33 797 A1 | 4/1992 |
| DE | 197 23 796 A1 | 12/1998 |
| EP | 0 268 201 A1 | 5/1988 |
| EP | 0 499 351 A1 | 8/1992 |
| EP | 0 824 039 A1 | 2/1998 |
| GB | 2 226 046 A | 6/1990 |
| JP | 52063891 A | 5/1977 |
| JP | 79 02986 | 1/1979 |
| JP | 54002986 A | 1/1979 |
| JP | 54010294 A | 1/1979 |
| JP | 07222924 A | 8/1995 |

* cited by examiner

*Primary Examiner*—Wayne A. Langel
*Assistant Examiner*—Jonas N Strickland
(74) *Attorney, Agent, or Firm*—Laurence A. Greenberg; Werner H. Stemer; Ralph E. Locher

(57) ABSTRACT

A process for regenerating a catalyst, in particular a plate-type or honeycomb catalyst, which has been at least partially deactivated by catalyst poisons, is described. The catalyst is treated with a gaseous reducing agent and with a polyfunctional complex-forming agent, so that the catalyst poisons are removed.

12 Claims, No Drawings

PROCESS FOR REGENERATING A DEACTIVATED CATALYST

CROSS-REFERENCE TO RELATED APPLICATION

This is a continuation of copending International Application PCT/DE99/02067, filed Jul. 5, 1999, which designated the United States.

BACKGROUND OF THE INVENTION

FIELD OF THE INVENTION

The invention relates to a process for regenerating a catalyst, in particular a plate-type or honeycomb catalyst, which has been at least partially deactivated by catalyst poisons, the catalyst being treated with a gaseous reducing agent in order to remove the catalyst poisons.

Catalysts, such as for example plate-type and honeycomb catalysts, which are preferably configured as oxidation or reduction catalysts, are used in particular to clean off-gases or exhaust gases. These gas cleaning catalysts are poisoned and deactivated during use by catalyst poisons which are contained in the gases, in the form, for example, of heavy metals, such as mercury, arsenic, thallium, etc. This "poisoning" of the catalysts results from the deposition of heavy metal compounds (oxides, sulfates) and arsenic oxides and from arsenic compounds and/or phosphates of these active components formed as a result of a reaction with catalyst active components, such as for example W, V, Mo, Fe, Cu, Co, Ni, Cr.

On account of the high costs involved in replacing a deactivated catalyst with a new catalyst, regeneration processes involving washing the catalysts have been developed. Japanese Patent JP 07222924 C in the name of MITSUBISHI has disclosed a regeneration process of this type for a deNOx catalyst in which the catalyst can be reactivated by washing with water or dilute inorganic acid followed by washing with oxalic acid and finally washing with water.

Japanese Patent JP 52063891 C discloses a regeneration process for a deactivated $TiO_2/V_2O_5$ catalyst in which the washing is carried out using a 5% strength $NH_3$ solution. A process in which the catalyst is washed with an oxalic acid and is then impregnated with a vanadium compound is known from Japanese Patent JP 54010294 C.

Published, European Patent Application EP 0 824 039 A1, Published, Non-Prosecuted German Patent Application DE 34 30 887 A1, German Patent DE 1 171 206 B and Chem. Abstr. No. 91:26538 relating to Japanese Patent Application JP 7902986 A disclose processes for regenerating a catalyst in which the catalyst is treated with a gaseous reducing agent.

In the process which is known from Published, European Patent Application EP 0 824 039 A1, a catalyst which has been poisoned by arsenic is treated with a gaseous reducing agent, such as $H_2$, CO and $CH_4$, during a thermal treatment.

In Published, Non-Prosecuted German Patent Application DE 34 30 887 A1, a process is described for reactivating a catalyst which has been used to remove $NO_x$ from flue gases, the catalyst is exposed to a heated stream of carbon monoxide in a reducing atmosphere.

The process described in German Patent DE 1 171 206 B relates to the regeneration of lead-contaminated catalysts for cleaning exhaust gases from internal combustion engines. In this case, the contaminated catalyst is regenerated with a reducing gas, such as hydrogen, carbon monoxide and hydrocarbons, at elevated temperatures.

The publication Chem. Abstr. No. 91:26538 relating to Japanese Patent Application JP 7902986 A deals with the regeneration of desulfurization and denitrification catalysts. In this case, the catalyst is regenerated in a reducing gas at between 700 and 1000° C.

A drawback of the known processes for regenerating the catalysts by washing with water or acids and/or subsequently applying active components is that soluble or partially soluble catalyst active components are washed out, with the result that the efficiency of the catalytic converter is reduced.

SUMMARY OF THE INVENTION

It is accordingly an object of the invention to provide a process for regenerating a deactivated catalyst which overcomes the above-mentioned disadvantages of the prior art methods of this general type, in which the regeneration effect is improved.

With the foregoing and other objects in view there is provided, in accordance with the invention, a process for regenerating catalysts. The process includes treating a catalyst with a gaseous reducing agent to remove catalyst poisons; and washing the catalyst with a polyfunctional complex-forming agent. The polyfunctional complex-forming agent is a hydroxycarboxylic acid, a hydroxydicarboxylic acid solution or a solution of organic amines.

According to the first alternative, the object is achieved, according to the invention, by the fact that, following the treatment with the gaseous reducing agent, the catalyst is washed with a polyfunctional complex-forming agent, the polyfunctional complex-forming agent used being a hydroxycarboxylic acid, a hydroxydicarboxylic acid solution or a solution of organic amines.

In accordance with an added feature of the invention, there is the step of subjecting the catalyst to an impregnation process with at least one catalyst active component, which is suspended or dissolved in the polyfunctional complex-forming agent, after the washing step.

In accordance with an additional feature of the invention, there is the step of selecting the catalyst active component from W, V, Mo, Fe, Cu, Fe, Co, Ni, and/or Cr.

In accordance with another feature of the invention, the catalyst is a plate-type catalyst or a honeycomb catalyst which has been at least partially deactivated by the catalyst poisons.

In accordance with a further feature of the invention, after the washing step, there is the step of drying the catalyst at a temperature of below 70° C. with air being passed through it.

In accordance with another added feature of the invention, there is the step of subjecting the catalyst to at least one thermal treatment process immediately after the catalyst has been treated with the gaseous reducing agent, after the catalyst has been washed with polyfunctional complex-forming agents, after the impregnation process with the polyfunctional complex-forming agent containing the catalyst active component, and/or after the drying of the catalyst step.

In accordance with another additional feature of the invention, there is the step of carrying out the thermal treatment process within a temperature range of from 100 to 500° C.

With the foregoing and other objects in view there is further provided, in accordance with the invention, a process for regenerating catalysts. The process includes treating a catalyst with a gaseous reducing agent to remove catalyst poisons; and subjecting the catalyst to an impregnation process with at least one catalyst active component. The catalyst active component is suspended or dissolved in a polyfunctional complex-forming agent, and the polyfunctional complex-forming agent used is a hydroxycarboxylic acid, a hydroxydicarboxylic acid solution or a solution of organic amines.

According to the second alternative, the object is achieved, according to the invention, by the fact that, following the treatment with the gaseous reducing agent, the catalyst is subjected to an impregnation process with at least one catalyst active component which is suspended or dissolved in a polyfunctional complex-forming agent, the polyfunctional complex-forming agent used being a hydroxycarboxylic acid, a hydroxydicarboxylic acid solution or a solution of organic amines.

In accordance with a concomitant feature of the invention, there is the step of subjecting the catalyst to at least one thermal treatment process immediately after the catalyst has been treated with the gaseous reducing agent, after the impregnation process with the polyfunctional complex-forming agent containing the catalyst active component, and/or after the drying of the catalyst step.

Other features which are considered as characteristic for the invention are set forth in the appended claims.

Although the invention is and described herein as a process for regenerating a deactivated catalyst, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DESCRIPTION OF THE PREFERRED EMBODIMENTS

Reactions between a catalyst poison and active components of a catalytic converter in some cases lead to the formation of chemically stable compounds, in particular heavy metal compounds (oxides/sulfates), arsenic oxides and/or arsenic compounds and phosphates of the active components etc. These compounds which are formed as a result of a reaction with the active components (W, Mo, V) result in that the latter are no longer available as active catalysts. The regeneration process converts the chemical bond between the immobilized catalyst poisons and the catalyst active components, by a treatment with a gaseous reducing agent under reducing conditions, into an oxidation number at which the corresponding compound with the active component becomes chemically unstable and therefore capable of desorption with simultaneous immobility of the active component. Finally, the gas stream removes the volatile heavy metal compounds (e.g. $As_2O_3$, $AsCl_3$, carbonyls, hydrides, etc.) from the catalyst material without entraining the active components. The deactivation is thus reversed. The gaseous reducing agents used may, for example, be $SO_2$, CO, $H_2$, $CH_4$, $NH_3$ etc. or combinations thereof or with HCl.

A particularly high regenerating action by the gaseous reducing agent stream is achieved if the catalyst is thermally treated at a temperature of from 100 to 500° C. during the gaseous reducing agent treatment. This is advantageous since, depending on the reactivity of the gaseous reducing agent, the optimum reaction rate may lie at different temperatures. In some cases, the reaction between the catalyst poison and the catalyst active component may result in the formation of compounds which are chemically stable and only become unstable, and therefore lose their immobility, within certain temperature ranges.

Some reducing agents cannot be thermally heated. With these reducing agents, the thermal treatment is carried out after the catalyst has been exposed to the gaseous reducing agent. This leads to the same regenerating effect as if the thermal treatment had been carried out during the reducing agent treatment.

To further improve the regeneration effect, the catalysts are washed with a polyfunctional complex-forming agent after the gaseous reducing agent treatment, in order to partially dissolve the active components of the catalyst which have been released again and to ensure that they are homogeneously distributed. The polyfunctional complex-forming agent used is hydroxycarboxylic acid or hydroxydicarboxylic acid solutions. It is also optionally possible to use solutions of organic amines instead of the hydroxycarboxylic or hydroxydicarboxylic acid solution. The organic amines are especially effective in particular for vanadium.

To achieve a particularly homogeneous distribution of the active components in the catalyst following the regeneration step using gas, the catalyst, after it has been washed with a polyfunctional complex-forming agent, such as hydroxycarboxylic acid solutions, hydroxydicarboxylic acid solutions or solutions of organic amines, is subjected to an impregnation process with active components. The latter are dissolved or suspended in the polyfunctional complex-forming agent. The treatment with hydroxycarboxylic acid or hydroxydicarboxylic acid solutions improves the distribution of active components in the regenerated catalyst.

Alternatively, the process step of washing the catalyst with the polyfunctional complex-forming agent is replaced by the impregnation process described above.

The level of regeneration can also be increased if, immediately after the catalyst has been treated with a gaseous reducing agent and/or after the catalyst has been washed with polyfunctional complex-forming agents and/or after the impregnation process with a polyfunctional complex-forming agent which contains catalyst active components and/or after the drying of the catalyst, the catalyst is subjected to at least one thermal treatment.

Although the process for regenerating a deactivated catalyst is equally suitable for all forms of catalyst, a preference which should be mentioned here is the selective catalytic reduction (SCR) deNOx catalyst based on $TiO_2$ doped with $WO_3/MoO_3$ and $V_2O_5$, optionally diluted with inactive material and/or fillers.

After the catalysts have been regenerated, the gaseous cleaning agents can be eliminated by cleaning devices (desulfurization or denitrification) by use of $NH_3$. Particularly suitable or frequently used cleaning agents are $SO_2$ and $NH_3$, since they are easy to manage and are in any case present in the off-gas or exhaust. $CH_4$ and natural gas, which are likewise present in the case of a large-scale combustion plant for "additional fire", also have advantageous cleaning agent properties.

Further advantages, features and details of the invention are explained below by a preferred exemplary embodiment for a regeneration process according to the invention.

The starting point is an SCR catalyst that has been deactivated by arsenic. The catalyst is subjected to the now described treatment.

1. An off-gas or exhaust gas which contains 1000 vppm $SO_2$ as a gaseous reducing agent flows through the deactivated SCR catalyst for 24 hours at a temperature of 400° C.
2. The catalyst is then cooled to ambient temperature.
3. Then, a mixture with a mixing ratio of 20% by weight monoethanolamine to water is injected into the catalyst until the liquid uptake of the catalyst is saturated. Depending on the state of the SCR catalyst which is to be activated, up to 20% by weight ammonium metavanadate is added to the mixture of monoethanolamine and water.
4. Next, the catalyst is dried as a result of air being passed through it at a temperature of less than 60° C.
5. The ammonium metavanadate becomes chemically stable as a result of subsequent thermolysis within a temperature range of from 200 to 250° C., which can be carried out as part of the restarting of an installation that incorporates the catalyst.

A comparison of the catalyst before and after it is regenerated reveals that the $NO_x$ activity is increased by up to 50%.

I claim:

1. A process for regenerating catalysts, which comprises the steps of:
    treating a catalyst with a gaseous reducing agent to remove catalyst poisons; and
    washing the catalyst with a polyfunctional complex-forming agent, the polyfunctional complex-forming agent being selected from the group consisting of a hydroxycarboxylic acid, a hydroxydicarboxylic acid solution and a solution of organic amines.

2. The process according to claim 1, which comprises subjecting the catalyst to an impregnation process with at least one catalyst active component which is one of suspended and dissolved in the polyfunctional complex-forming agent after the washing step.

3. The process according to claim 2, which comprises selecting the catalyst active component from the group consisting of at least one of W, V, Mo, Fe, Cu, Fe, Co, Ni, and Cr.

4. The process according to claim 2, which comprises after the washing step, drying the catalyst at a temperature of below 70° C. with air being passed through it.

5. The process according to claim 4, which comprises subjecting the catalyst to at least one thermal treatment process immediately after at least one of the catalyst having been treated with the gaseous reducing agent, after the catalyst has been washed with polyfunctional complex-forming agents, after the impregnation process with the polyfunctional complex-forming agent containing the catalyst active component, and after the drying of the catalyst step.

6. The process according to claim 5, which comprises carrying out the thermal treatment process within a temperature range of from 100 to 500° C.

7. The process according to claim 1, which comprises selecting the catalyst from the group consisting of plate catalysts and honeycomb catalysts which have been at least partially deactivated by the catalyst poisons.

8. A process for regenerating catalysts, which comprises the steps of:
    treating a catalyst with a gaseous reducing agent to remove catalyst poisons; and
    subjecting the catalyst to an impregnation process with at least one catalyst active component, the catalyst active component being one of suspended and dissolved in a polyfunctional complex-forming agent, the polyfunctional complex-forming agent used being selected from the group consisting of a hydroxycarboxylic acid, a hydroxydicarboxylic acid solution and a solution of organic amines.

9. The process according to claim 8, which comprises selecting the catalyst from the group consisting of plate catalysts and honeycomb catalysts which have been at least partially deactivated by the catalyst poisons.

10. The process according to claim 8, which comprises after the impregnation process, drying the catalyst at a temperature of below 70° C. with air being passed through it.

11. The process according to claim 10, which comprises subjecting the catalyst to at least one thermal treatment process immediately after at least one of the catalyst having been treated with the gaseous reducing agent, after the impregnation process with the polyfunctional complex-forming agent containing the catalyst active component, and after the drying of the catalyst step.

12. The process according to claim 11, which comprises carrying out the thermal treatment process within a temperature range of from 100 to 500° C.

* * * * *